United States Patent
Sasao et al.

(10) Patent No.: US 10,242,428 B2
(45) Date of Patent: Mar. 26, 2019

(54) TRANSPARENT DISPLAY APPARATUS AND DRIVING METHOD THEREOF

(71) Applicant: Samsung Display Co., Ltd., Yongin-Si, Gyeonggi-Do (KR)

(72) Inventors: Yukiyoshi Sasao, Yokohama (JP);
Masatoshi Sonoda, Yokohama (JP);
Takahisa Yamamoto, Yokohama (JP)

(73) Assignee: Samsung Display Co., Ltd. (KR)

( * ) Notice: Subject to any disclaimer, the term of this patent is extended or adjusted under 35 U.S.C. 154(b) by 52 days.

(21) Appl. No.: 15/445,675

(22) Filed: Feb. 28, 2017

(65) Prior Publication Data
US 2017/0352128 A1 Dec. 7, 2017

(30) Foreign Application Priority Data
Jun. 7, 2016 (KR) .................. 10-2016-0070531

(51) Int. Cl.
*G06T 3/00* (2006.01)
*G06T 7/194* (2017.01)
(Continued)

(52) U.S. Cl.
CPC .......... *G06T 3/0093* (2013.01); *G06K 9/0061* (2013.01); *G06K 9/00604* (2013.01); *G06K 9/4604* (2013.01); *G06T 5/003* (2013.01); *G06T 5/50* (2013.01); *G06T 7/13* (2017.01); *G06T 7/194* (2017.01); *G09G 3/2003* (2013.01); *G09G 3/3266* (2013.01); *G09G 3/3275* (2013.01);
(Continued)

(58) Field of Classification Search
CPC ......... G06T 3/0093; G06T 7/194; G06T 5/50; G06T 2207/20224; G06T 19/006; G06K 9/00671
See application file for complete search history.

(56) References Cited

U.S. PATENT DOCUMENTS

2007/0002130 A1 1/2007 Hartkop
2015/0192992 A1 7/2015 Di Censo et al.
(Continued)

FOREIGN PATENT DOCUMENTS

JP 2014-216962 A 11/2014
JP 2015-022589 A 2/2015

OTHER PUBLICATIONS

Ko Nishino and Shree K. Nayar. 2006. Corneal Imaging System: Environment from Eyes. Int. J. Comput. Vision 70, 1 (Oct. 2006), 23-40. DOI=http://dx.doi.org/10.1007/s11263-006-6274-9.*

*Primary Examiner* — Antonio A Caschera
(74) *Attorney, Agent, or Firm* — Innovation Counsel LLP

(57) ABSTRACT

The present disclosure is related to a method for driving a transparent display device. The method includes extracting a corneal reflection image, generating a flat target image, generating a background image, and displaying the background image on a transparent display panel. The corneal reflection image includes a target image formed by projecting, on a cornea of a user, a display area of the transparent display panel divided into the display area which displays a display image and transmits light reflected from a background and a non-display area adjacent to the display area. The flat target image is generated by correcting the target image distorted by a curved shape of the cornea. The background image is formed by removing the display image from the flat target image.

19 Claims, 9 Drawing Sheets

(51) Int. Cl.
*G06T 7/13* (2017.01)
*G06K 9/00* (2006.01)
*G06K 9/46* (2006.01)
*G06T 5/00* (2006.01)
*G06T 5/50* (2006.01)
*G09G 3/20* (2006.01)
*G09G 3/3266* (2016.01)
*G09G 3/3275* (2016.01)
*G09G 3/36* (2006.01)

(52) U.S. Cl.
CPC ......... *G09G 3/3677* (2013.01); *G09G 3/3688* (2013.01); *G06T 2207/10024* (2013.01); *G06T 2207/20192* (2013.01); *G06T 2207/20224* (2013.01); *G09G 2320/0666* (2013.01); *G09G 2320/0686* (2013.01); *G09G 2340/00* (2013.01); *G09G 2340/0407* (2013.01); *G09G 2354/00* (2013.01)

(56) References Cited

U.S. PATENT DOCUMENTS

2015/0235355 A1    8/2015  Mullins
2017/0169578 A1*  6/2017  Nakazawa ............. A61B 3/113

\* cited by examiner

TRANSPARENT DISPLAY APPARATUS AND DRIVING METHOD THEREOF

CROSS-REFERENCE TO RELATED APPLICATIONS

This U.S. non-provisional patent application claims priority under 35 U.S.C. § 119 to Korean Patent Application No. 10-2016-0070531, filed on Jun. 7, 2016, the entire contents of which are hereby incorporated by reference.

BACKGROUND

The present disclosure herein relates to a transparent display device and a method for driving the same and more particularly, to a transparent display device which acquires a background image by correcting a corneal reflection image and a method for driving the same.

A transparent display device represents a display device having a screen, the background of which is seen therethrough the display device. Typical transparent display devices were implemented through projection onto a non-emissive liquid crystal panel, but at the present time, transparent display devices are being developed using transparent display elements. Liquid crystal display (LCD) devices have an excellent light shielding ratio, but it is difficult to use LCD devices as transparent display devices since LCD devices use two polarizing plates causing a low transmittance. Transparent display devices are typically implemented using organic light emitting diode (OLED) display devices capable of self emission. Transparent display devices may be applied to a front windshield of a vehicle or glass for a house to simultaneously provide information of the display devices and environment information to users.

Transparent display devices directly transmit light incident to the back side of the transparent display devices by virtue of light transmissivity so that the light may arrive at a user's eye. Since the light incident to the back side is directly transmitted to the user's eye, an object at the rear of the display device may be visually recognized by the user.

To improve image quality factors of transparent display devices, such as contrast, sharpness, brightness, etc., not only a display image but also a background image seen therethrough are required. However, transparent display devices are unable to acquire a background image without an additional sensor.

SUMMARY

The present disclosure provides a transparent display device which acquires a background image being seen by a user by using a corneal reflection image and a method for driving the same.

An embodiment of the inventive concept provides a method for driving a transparent display device, the method including extracting a corneal reflection image, generating a flat target image, generating a background image, and displaying the background image on a transparent display panel.

The transparent display panel comprises a display area which displays a display image and transmits light reflected from a background and a non-display area outside the display area. The display image is provided by the transparent display device. The corneal reflection image includes a target image formed by projecting the display area on a cornea of a user and an edge image formed by projecting the non-display area (bezel area) on the cornea.

The extracting the corneal reflection image includes capturing an image of an eye of the user, and generating the corneal reflection image from the captured image of the eye.

The flat target image is generated by correcting the target image distorted by a curved shape of the cornea. The generating the flat target image includes correcting the corneal reflection image into a flat image, and extracting the flat target image from the flat image.

The correcting the corneal reflection image into the flat image includes correcting the edge image into a flat edge image. In this case, the extracting the flat target image includes detecting the flat edge image, and specifying an image surrounded by the flat edge image as the flat target image. The detecting the flat edge image includes extracting feature points of the flat edge image according to passage of time.

During the extracting the flat target image, a display pattern displayed by the transparent display panel may be used instead of the edge image. The extracting the flat target image may include detecting a display pattern image formed by projecting the display pattern on the cornea, and specifying the flat target image by detecting a location of the display area on the basis of the display pattern image. The generating the background image includes generating a transformed image, removing the display image from the transformed image, and correcting a sharpness of the transformed image.

In an embodiment of the inventive concept, a transparent display device includes a transparent display panel, a corneal reflection image extractor, an image detector, and a background image generator. The transparent display panel is divided into a display area which displays a display image and a non-display area adjacent to the display area.

The corneal reflection image extractor performs the extracting the corneal reflection image.

The image detector includes a de-warper and a flat target image extractor. The de-warper correct the corneal reflection image into the flat image. The flat target image extractor performs extracting the flat target image from the flat image.

The background image generator includes a modulator and a calculator. The modulator generates the transformed image by correcting a resolution and a shape of the flat target image. The calculator generates the background image by removing the display image from the transformed image.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Figure 1:
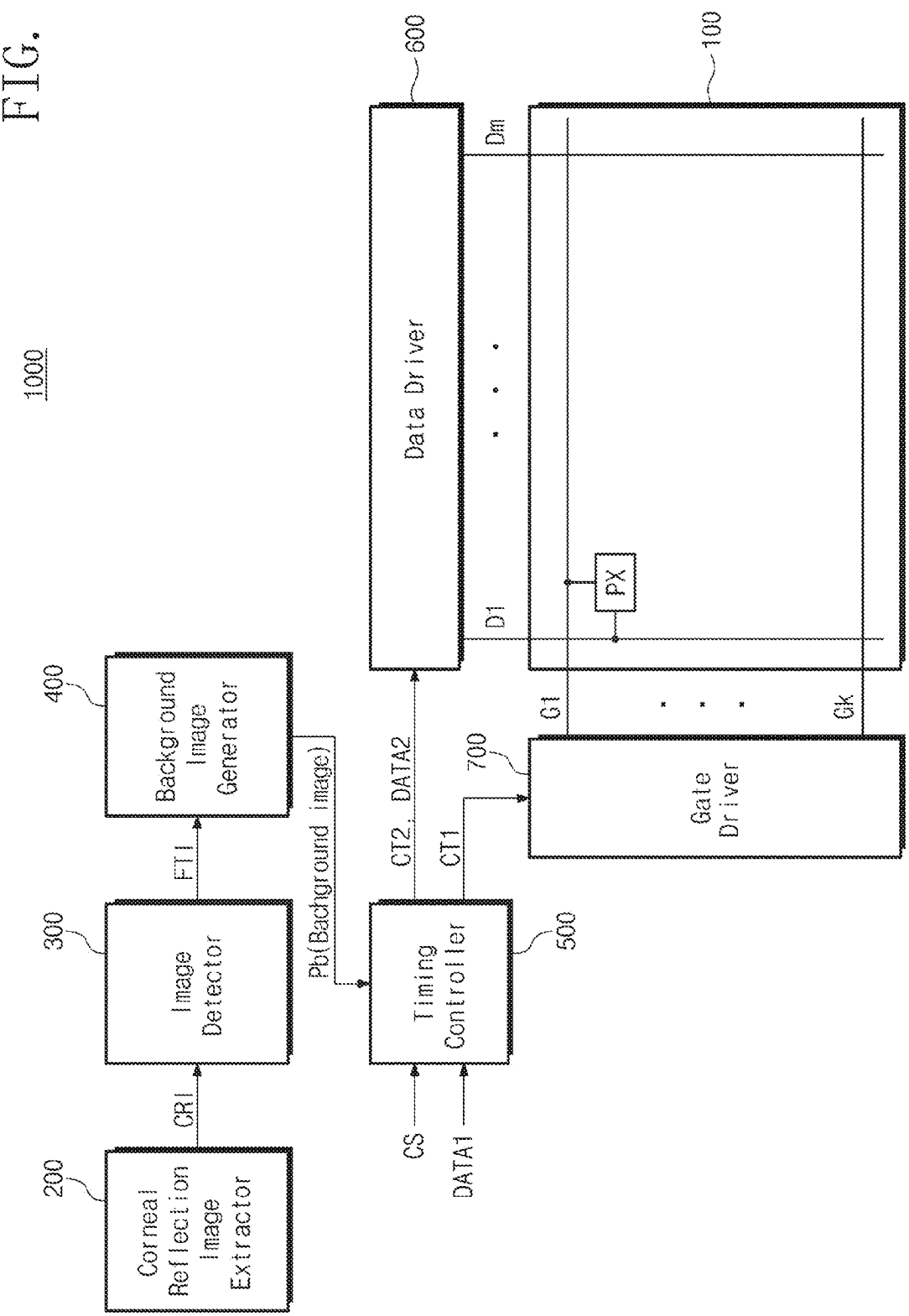
FIG. 1 is a block diagram illustrating a transparent display device according to an embodiment of the inventive concept.

FIG. 1 is a block diagram illustrating a transparent display device 1000 according to an embodiment of the inventive concept.

Referring to FIG. 1, the transparent display apparatus 1000 may include a transparent display panel 100, a corneal reflection image extractor 200, an image detector 300, a background image generator 400, a timing controller 500, a data driver 600, and a gate driver 700.

The transparent display panel 100 displays an image. The transparent display panel 100 may be one of various types of display panels, for example, a liquid crystal display panel or an organic light emitting display panel. The transparent display panel 100 includes a plurality of gate lines G1 to Gk for receiving a gate signal and a plurality of data lines D1 to Dm for receiving a data voltage. The gate lines G1 to Gk and the data lines D1 to Dm intersect with and are insulated from each other. A plurality of pixel areas arranged in a matrix form are defined in the transparent display panel 100, wherein each pixel area is provided with a plurality of pixels PX. Each pixel PX may be connected to one of the gate lines G1 to Gk and one of the data lines D1 to Dm.

The corneal reflection image extractor 200 generates a corneal reflection image CRI. The corneal reflection image extractor 200 provides the corneal reflection image CRI to the image detector 300. Relevant descriptions will be provided later.

The image detector 300 receives the corneal reflection image CRI from the corneal reflection image extractor 200. The image detector 300 generates a flat target image FTI by correcting the corneal reflection image CRI, and provides the flat target image FTI to the background image generator 400. Relevant descriptions will be provided later.

The background image generator 400 receives the flat target image FTI from the image detector 300. The background image generator 400 generates a background image Pb by correcting the flat target image FTI, and provides the background image Pb to the timing controller 500. Relevant descriptions will be provided later.

The timing controller 500 receives basic image data DATA1 from an external graphic controller (not shown) and a control signal CS. The timing controller 500 receives the control signal CS such as a vertical synchronization signal, a horizontal synchronization signal, a main clock, a data enable signal, etc. to output a first control signal CT1 and a second control signal CT2. Here, the first control signal CT1 is a gate control signal for controlling operation of the gate driver 700. The first control signal CT1 may include a gate clock CPV and a vertical initiation signal STV. The second control signal CT2 is a data control signal for controlling operation of the data driver 600. The second control signal CT2 includes a horizontal initiation signal for initiating operation of the data driver 600, a reversal signal for reversing polarities of a data voltage, and an output indication signal for determining a time for outputting the data voltage from the data driver 600.

The data driver 600 outputs, to the data lines D1 to Dm, a data voltage obtained by converting modulated image data DATA2, in response to the second control signal CT2.

The gate driver 700 is electrically connected to the gate lines G1 to Gk of the transparent display panel 100 to provide gate signals to the gate lines G1 to Gk. In detail, the gate driver 700 generates the gate signals for driving the gate lines G1 to Gk in response to the first control signal CT1, and sequentially outputs the gate signals to the gate lines G1 to Gk.

In the case where the transparent display device 1000 of an embodiment of the inventive concept is an organic light emitting display device, the transparent display device 1000 may further include a light emission driver (not shown) which receives a control signal from the timing controller 500 and provides light emission control signals to the transparent display panel 100. The light emission driver may control timings of currents which flow through organic light emitting diodes respectively.

Figure 2:
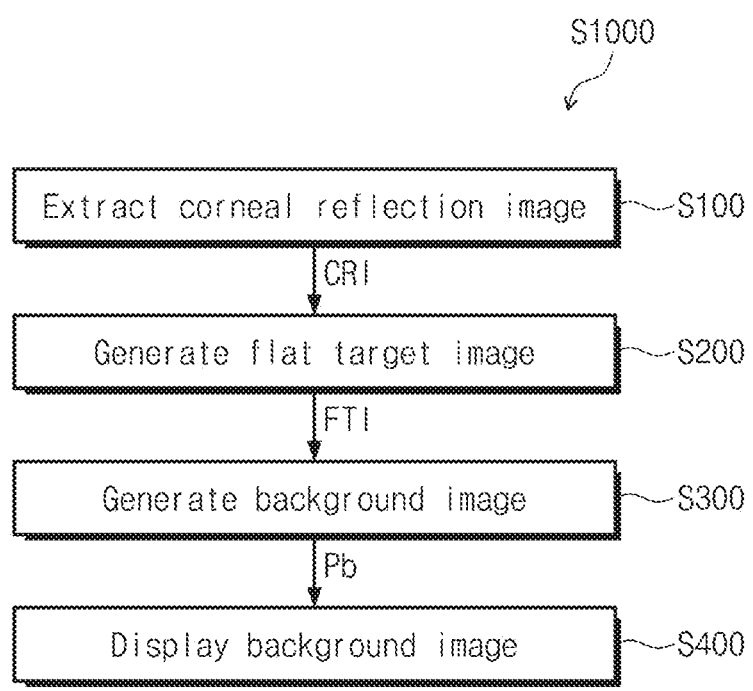
FIG. 2 is a flowchart illustrating a method for driving a transparent display device according to an embodiment of the inventive concept.
Figure 3:
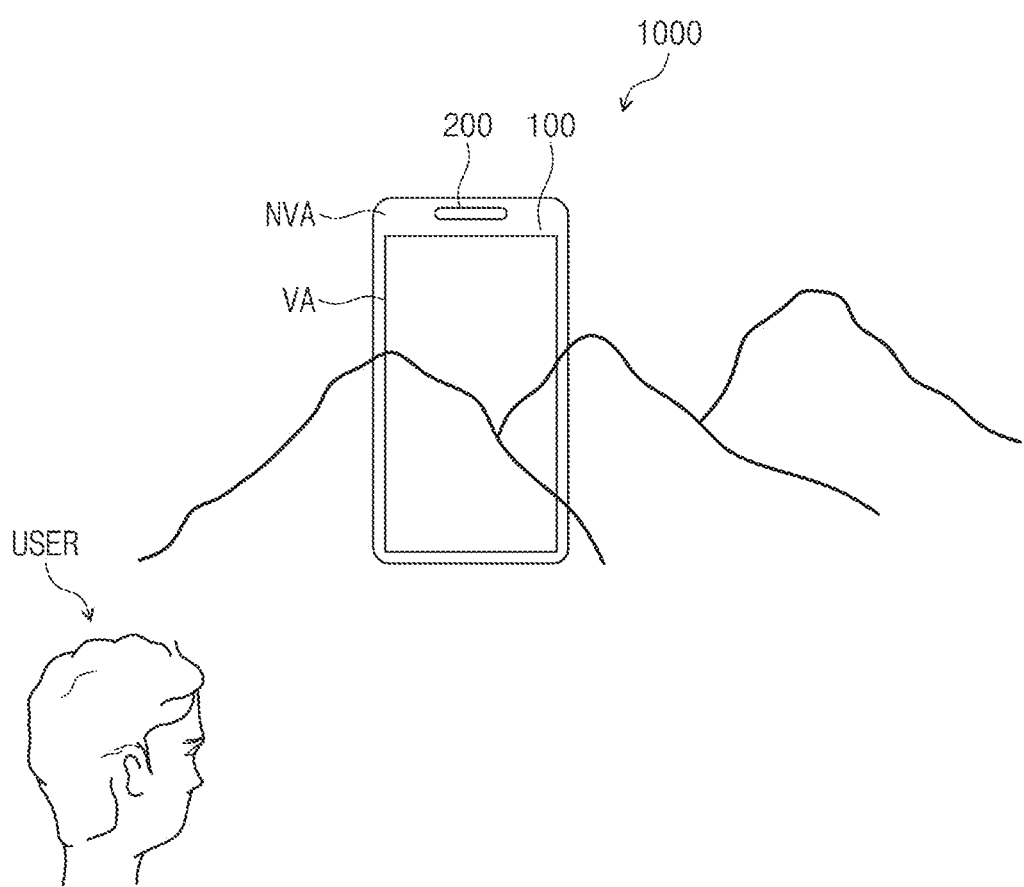
FIG. 3 is a block diagram illustrating a user and a transparent display device according to an embodiment of the inventive concept.

FIG. 2 is a flowchart illustrating a method S1000 for driving the transparent display device 1000 according to an embodiment of the inventive concept. FIG. 3 is a diagram illustrating a user USER and the transparent display device 1000 according to an embodiment of the inventive concept.

Referring to FIG. 2, the method S1000 for driving the transparent display device 1000 includes extracting a corneal reflection image (S100), generating a flat target image (S200), generating a background image (S300), and displaying the background image on the transparent display panel 100 (S400).

Referring to FIG. 3, the transparent display device 1000 includes a display area VA for displaying an image and a non-display area NVA adjacent to the display area VA. The display area VA may be transparent or semitransparent. The user USER may visually recognize a background located at a rear of the transparent display device 1000 through the display area VA. Furthermore, the timing controller 500 may receive the basic image data DATA1 so that a display image may be provided to the display area VA. The display area VA may include an area for providing a display image and an area for transmitting light reflected from the background.

Referring to FIGS. 2 and 3, during the extracting a corneal reflection image (S100), the corneal reflection image CRI projected on a cornea of the user USER is extracted. The corneal reflection image CRI includes a target image TI which is an image of the display area VA of the transparent display panel 100 projected on the cornea of the user USER. In detail, the user USER may see the background through the transparent display panel 100, and the corneal reflection image CRI includes the target image TI which is transmitted by the display area VA, arrives at the cornea of the user USER and then is reflected from the cornea of the user USER.

The corneal reflection image extractor 200 may be provided so as to correspond to a front surface of the transparent display device 1000 and the non-display area NVA. The corneal reflection image extractor 200 may be a front camera for capturing an image of the user USER. The corneal reflection image extractor 200 may captures an image of an eye of the user USER. In the case where an angle of view of a lens of the camera covers a wider area than the eye, the corneal reflection image extractor 200 may extract the corneal reflection image CRI using a face detection technique for detecting a face image or an eye detection technique for detecting an eye image.

The corneal reflection image extractor 200 extracts the corneal reflection image CRI of the user USER, and the transparent display device 1000 generates the background image Pb using the corneal reflection image CRI. Therefore, the transparent display device 1000 does not require an additional rear camera for extracting the background image Pb.

During the generating a flat target image (S200), the flat target image FTI is generated by correcting the target image TI distorted by the cornea. Since the cornea of the user USER is round, and the corneal reflection image CRI reflected from the cornea is like an image on a convex mirror, the target image TI is a distorted image which is different from an actual image recognized by the user USER through the cornea. Therefore, during the generation of a flat target image (S200), the flat target image FTI which is the same as the actual image is generated by correcting the distorted target image TI.

During the generation of a background image (S300), the background image Pb is generated by removing, from the flat target image FTI, a display image Pd displayed by the transparent display panel 100. The display image Pd represents an image formed by the pixels PX of the transparent display panel 100. An image formed on the cornea of the user USER includes not only the background image but also the display image Pd generated by the transparent display panel 100. Therefore, the transparent display device 1000 may acquire the background image Pb by removing the display image Pd from the flat target image FTI.

Figure 4:
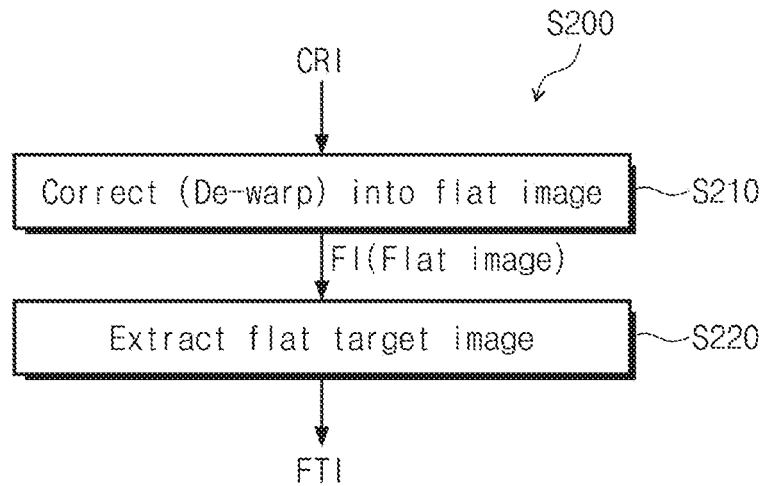
FIG. 4 is a flowchart illustrating a generation of a flat target image.
Figure 5:
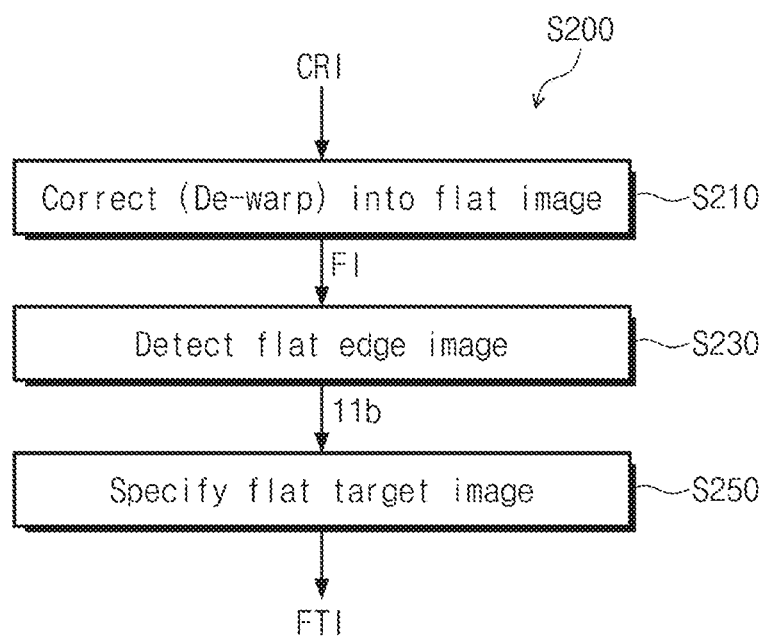
FIG. 5 is a flowchart illustrating an example of the operation of extracting a flat target image of FIG. 4 according to an embodiment of the inventive concept.
Figure 6A:
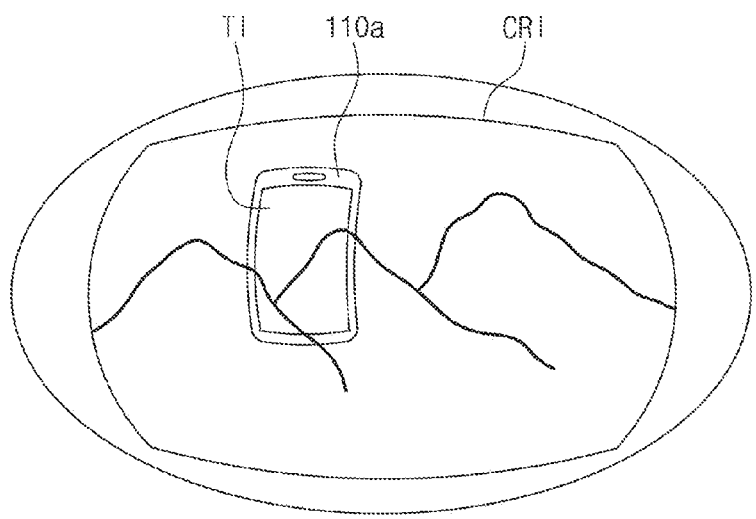
FIGS. 6A, 6B and 6C are diagrams illustrating a corneal reflection image, a flat image, and a flat target image in relation to FIG. 5.
Figure 6B:
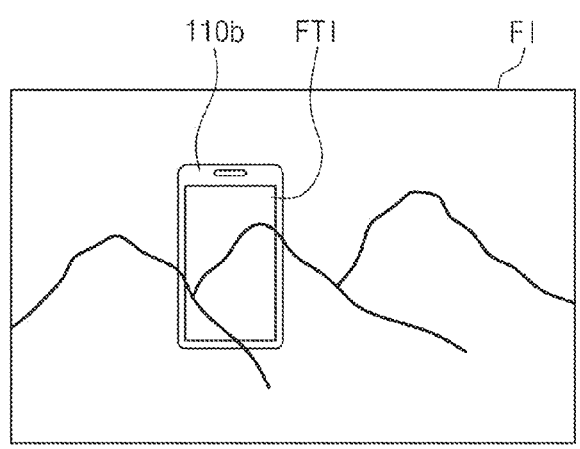
Figure 6C:
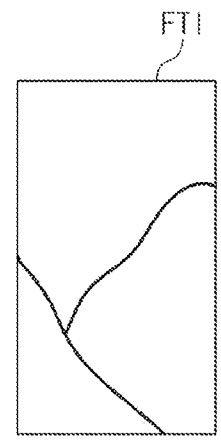

FIG. 4 is a flowchart illustrating the generation of a flat target image (S200), and FIG. 5 is a flowchart illustrating an example of the generating a flat target image (S200) of FIG. 4 according to an embodiment of the inventive concept. FIGS. 6A to 6C are diagrams illustrating the corneal reflection image CRI, a flat image FI, and the flat target image FTI in relation to the generating a flat target image (S200) of FIG. 5.

Referring to FIG. 4, the generation of a flat target image FTI (S200) includes correcting the corneal reflection image CRI into the flat image FI (S210, hereinafter referring to as de-warping) and extracting a flat target image FTI from the flat image FI (S220).

Referring to FIG. 5, the extracting a flat target image (S220) may include extracting a flat edge image 110b (S230) and specifying an image surrounded by the flat edge image 110b as the flat target image FTI.

FIG. 6A is a diagram illustrating the corneal reflection image CRI. The corneal reflection image CRI includes the target image TI and an edge image 110a.

The target image TI is an image formed by projecting the display area VA on the cornea of the user USER. In detail, the target image TI may include an image of the background reflected from the cornea after being transmitted by the transparent display panel 100 and the display image Pd displayed by the transparent display panel 100. The edge image 110a surrounds the target image TI. The edge image 110a is a projected image of the non-display area NVA of the transparent display panel 100 on the cornea of the user USER.

The cornea of the user USER may be identical to a convex mirror with a convex reflection surface. The corneal reflection image CRI may correspond to a projected image on a convex mirror of the background image. Therefore, the corneal reflection image CRI of FIG. 6A has a shape, a center part of which is extended and an outer part of which is contracted. The shapes of the target image TI and the edge image 110a are warped unlike actual shapes of the display area VA and the non-display area NVA.

FIG. 6B is a diagram illustrating the flat image FI. The flat image FI is generated by correcting the distorted corneal reflection image CRI due to a curved shape of the cornea. In detail, during the de-warping (S210), the flat image FI may be generated by detecting a curvature of the cornea in consideration of an angle of a warped object and performing a correction for de-warping a shape of the warped object.

The flat image FI includes the flat target image FTI and the flat edge image 110b. The target image TI and the edge image 110a having warped shapes are corrected so as to have the same shape as the actual transparent display device 1000 through the de-warping (S210). In detail, the target image TI is corrected into the flat target image FTI, and the edge image 110a is corrected into the flat edge image 110b.

The display area VA may be rectangular. In this case, the flat target image FTI may be corrected so as to have a rectangular shape.

FIG. 6C is a diagram illustrating the flat target image FTI. The flat target image FTI is formed through the detecting a flat edge image 110b (S230) and the specifying an image surrounded by the flat edge image 110b as the flat target image FTI (S250).

The flat edge image 110b may be detected using a color change due to the non-display area NVA. In the case where the display area VA is rectangular, the flat target image FTI may be specified by calculating four straight lines surrounding the flat target image FTI.

During the detection of a flat edge image (S230), feature points of the flat edge image 110b may be extracted according to passage of time. For example, a flat target image extractor 320 may extract a scale-invariant feature transform (SIFT) feature amount of the flat edge image 110b. The flat target image extractor 320 may specify an image surrounded by the extracted flat edge image 110b as the flat target image FTI.

Figure 7:
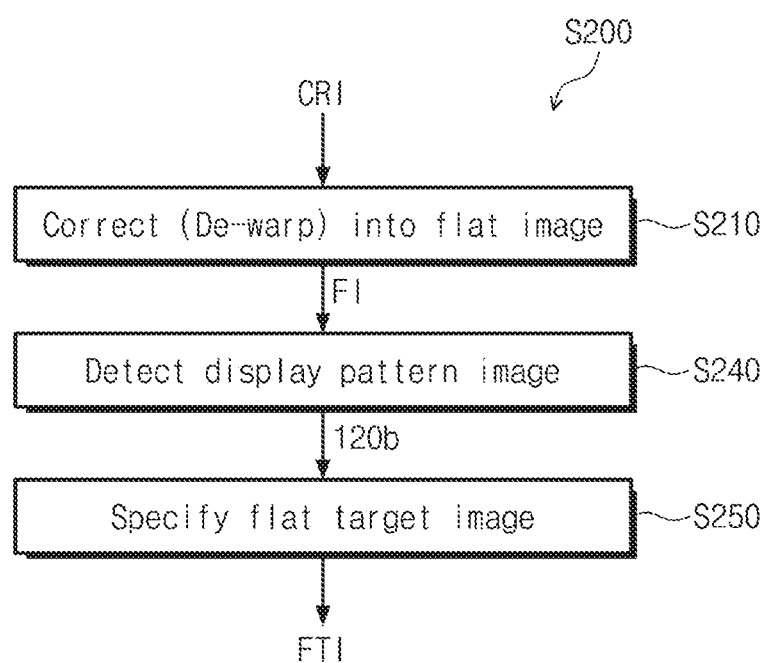
FIG. 7 is a flowchart illustrating generating generation of a flat target image according to another embodiment of the inventive concept.
Figure 8A:
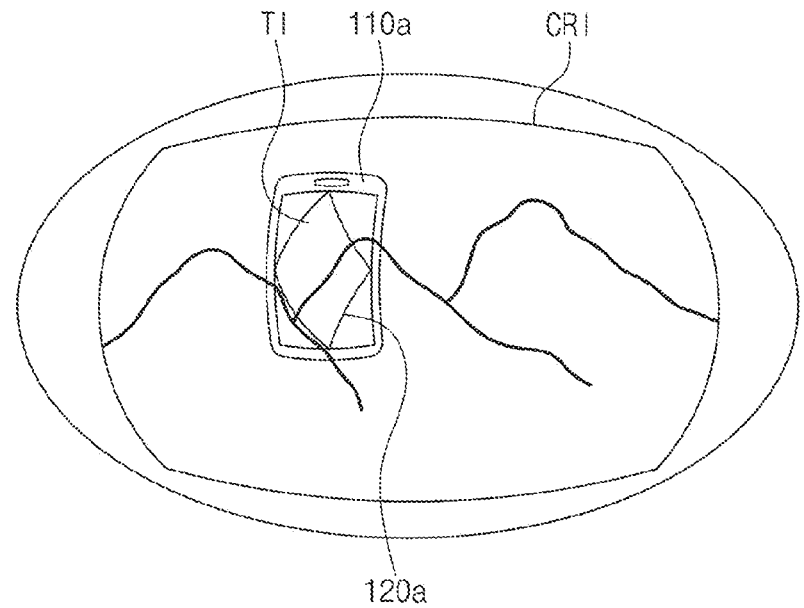
FIGS. 8A, 8B and 8C are diagrams illustrating a corneal reflection image, a flat image, and a flat target image in relation to FIG. 7.
Figure 8B:
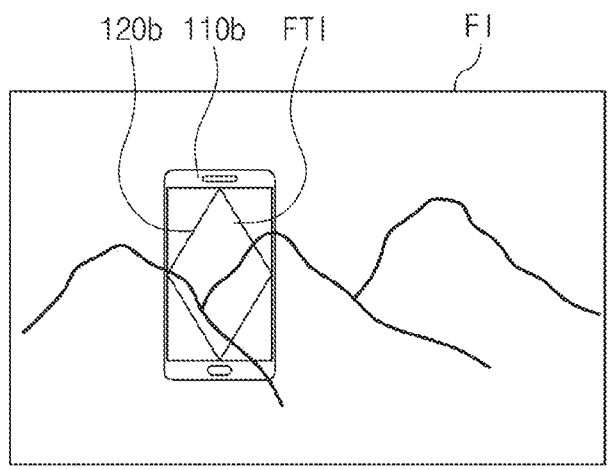
Figure 8C:
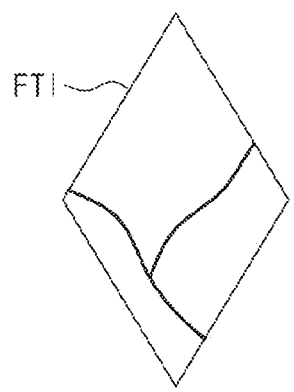

FIG. 7 is a flowchart illustrating the generation of a flat target image (S200) according to another embodiment of the inventive concept. FIGS. 8A to 8C are diagrams illustrating the corneal reflection image CRI, the flat image FI, and the flat target image FTI in relation to the generating a flat target image (S200) of FIG. 7.

Referring to FIG. 7, the extracting a flat target image (S220) may include de-warping (S210), detecting a display pattern image 120b (S240), and specifying an image surrounded by the display pattern image 120b as the flat target image (S250).

FIG. 8A is a diagram illustrating the corneal reflection image CRI. The corneal reflection image CRI includes the target image TI, the edge image 110a, and a display pattern reflection image 120a.

The transparent display panel 100 displays a display pattern 120, and the display pattern 120 is projected on the cornea so that the display pattern reflection image 120a is generated. The display pattern 120 is displayed on the transparent display panel 100 to define a display scope of the background image Pb.

FIG. 8B is a diagram illustrating the flat image FI. The flat image FI includes the flat target image FTI, the flat edge image 110b, and the flat display pattern image 120b. The flat display pattern image 120b is corrected so as to have the same shape as the display pattern 120 through the de-warping (S210). That is, the display pattern reflection image 120a is corrected into the flat display pattern image 120b.

Although the flat display pattern image 120b is shaped like a diamond in FIG. 8B, an embodiment of the inventive concept is not limited thereto, and thus the flat display pattern image 120b may have various shapes so as to correspond to the display scope of the background image Pb to be extracted by the user USER.

FIG. 8C is a diagram illustrating the flat target image FTI. The flat target image FTI is formed through the detecting a display pattern image (S240) and the specifying the flat target image FTI by detecting a location of the display area VA on the basis of the flat display pattern image 120b.

The flat display pattern image 120b may be detected using a color change due to the display pattern 120. During the detecting a display pattern image (S240), feature points of the flat display pattern image 120b may be extracted according to passage of time. During the detecting a display pattern image (S240), a SIFT feature amount of the flat display pattern image 120b may be extracted. The flat target image extractor 320 may specify an image surrounded by the extracted flat display pattern image 120b as the flat target image FTI.

Figure 9:
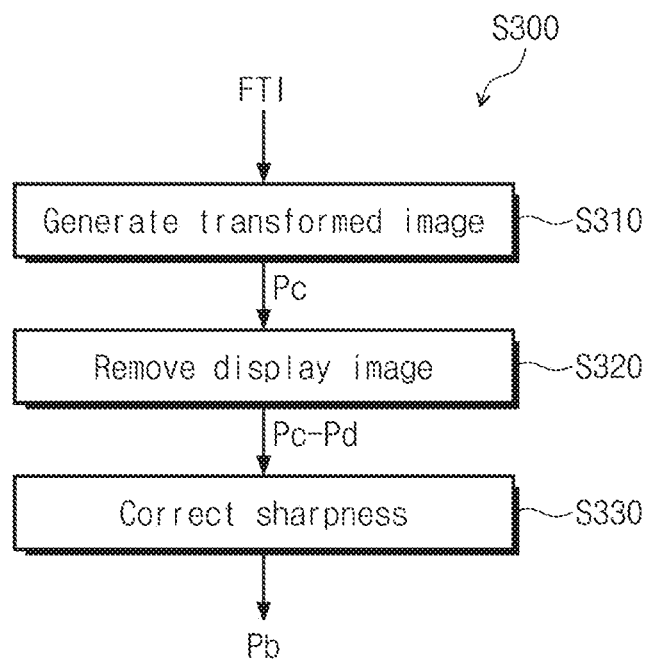
FIG. 9 is a flowchart illustrating a generation of a background image according to an embodiment of the inventive concept.

FIG. 9 is a flowchart illustrating the generation of a background image (S300) according to an embodiment of the inventive concept.

Referring to FIG. 9, the generation of a background image (S300) may include generating a transformed image (S310), removing a display image (S320), and correcting a sharpness of a transformed image Pc (S330).

During the generation of a transformed image (S310), the transformed image Pc is generated by correcting a resolution and shape of the flat target image FTI. The flat target image FTI is corrected so that the resolution and the shape are compatible with specifications of the transparent display device 1000. The flat target image FTI may be corrected into the transformed image Pc through at least one of translation, scaling, rotation, or shearing of affine transformation.

During the removal of a display image (S320), the display image Pd is removed from the transformed image Pc. Since the display image Pd is also projected on the cornea of the user USER, the display image Pd is required to be removed to acquire the background image Pb from the transformed image Pc.

During the correction of a sharpness (S330), an image degraded due to a limited transmittance aa of the transparent display panel 100 is corrected. Since the actual background is projected on the cornea of the user USER after being transmitted by the transparent display panel 100, a part of the background is reflected from the transparent display panel 100 due to the limited transmittance aa of the transparent display panel 100, and another part of the background is projected on the cornea. Therefore, the background image Pb which is the same as the actual background image may be acquired from the transformed image Pc by correcting the image degraded due to the limited transmittance aa.

Provided that the background image is Pb, the display image is Pd, the transmittance of the transparent display panel is aa, and the transformed image is Pc, the background image satisfies the equation Pb=(Pc−Pd)/aa. In detail, during the correction of a sharpness (S330), the background image Pb may be generated through a correction performed by removing the display image Pd from the transformed image Pc and then dividing a resultant value by the transmittance aa of the transparent display panel 100.

The generation of a background image S300 may further include correcting a sharpness degraded due to a reflectance of the cornea. Not only the transparent display panel 100 but also the cornea of the user USER absorbs a part of an image and reflects another part of the image. Therefore, the background image Pb may be generated from the transformed image Pc by dividing the light reflectance of the cornea.

The generation of a background image S300 may further include correcting a chroma change according to a light absorption ratio of a pupil of the user. Colors of the pupil of users are various, and absorption ratios of wavelengths change according to pupil colors. Therefore, the color of the cornea of the user USER may be extracted to correct the color of the transformed image so that the color of the transformed image is equal to the color of the actual background.

Figure 10:
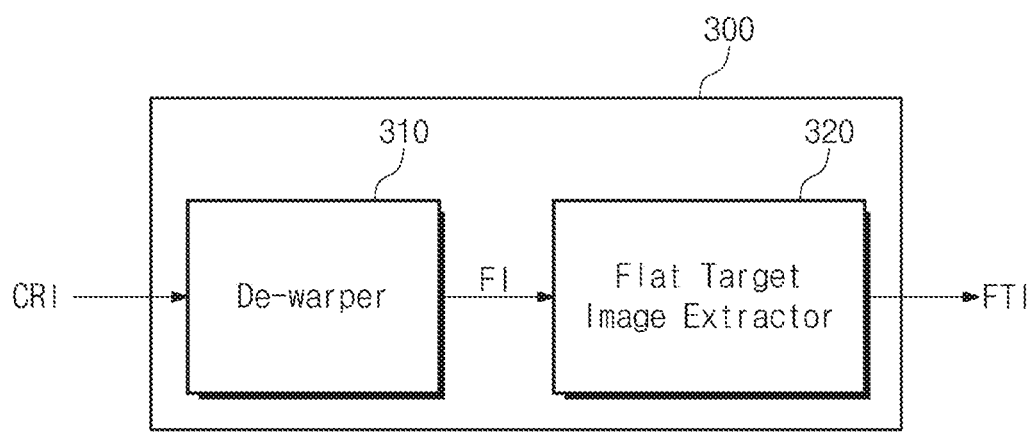
FIG. 10 is a block diagram illustrating an image detector according to an embodiment of the inventive concept.

FIG. 10 is a block diagram illustrating the image detector 300 according to an embodiment of the inventive concept.

Referring to FIG. 10, the image detector 300 includes a de-warper 310 and the target image extractor 320.

The de-warper 310 performs the de-warping (S210) to correct the corneal reflection image CRI into the flat image FI. That is, the de-warper 310 receives the corneal reflection image CRI, and provides the flat image FI to the flat target image extractor 320.

The flat target image extractor 320 performs the extracting a flat target image from the flat image FI (S220). That is, the flat target image extractor 320 receives the flat image FI, and provides the flat target image FTI to the background image generator 400.

Figure 11:
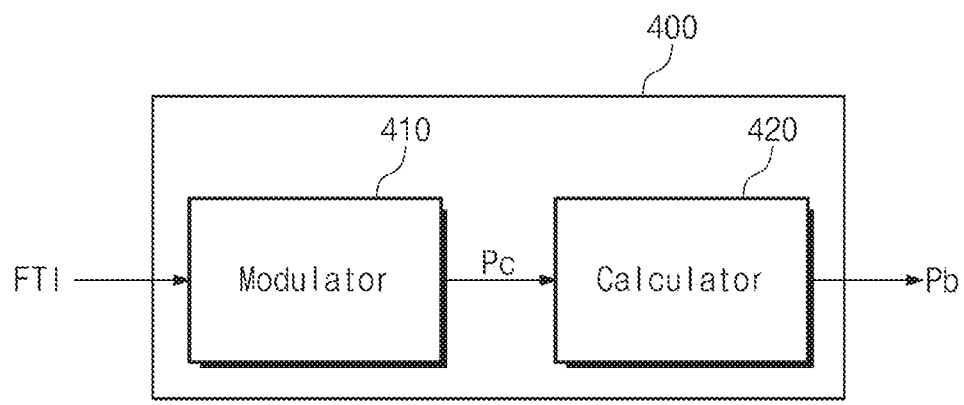
FIG. 11 is a block diagram illustrating a background image generator according to an embodiment of the inventive concept.

FIG. 11 is a block diagram illustrating the background image generator 400 according to an embodiment of the inventive concept.

Referring to FIG. 11, the background image generator 400 includes a modulator 410 and a calculator 420.

The modulator 410 generates a transformed image Pc from the flat target image FTI (S310). That is, the modulator 410 receives the flat target image FTI, and provides the transformed image Pc to the calculator 420.

The calculator 420 removes a display image from the transformed mage Pc (S320) and the correcting a sharpness of the transformed image Pc (S330). That is, the calculator 420 receives the transformed image Pc, removes the display image Pd therefrom, and corrects the sharpness degraded due to the limited transmittance aa to output the background image Pb.

Figure 12:
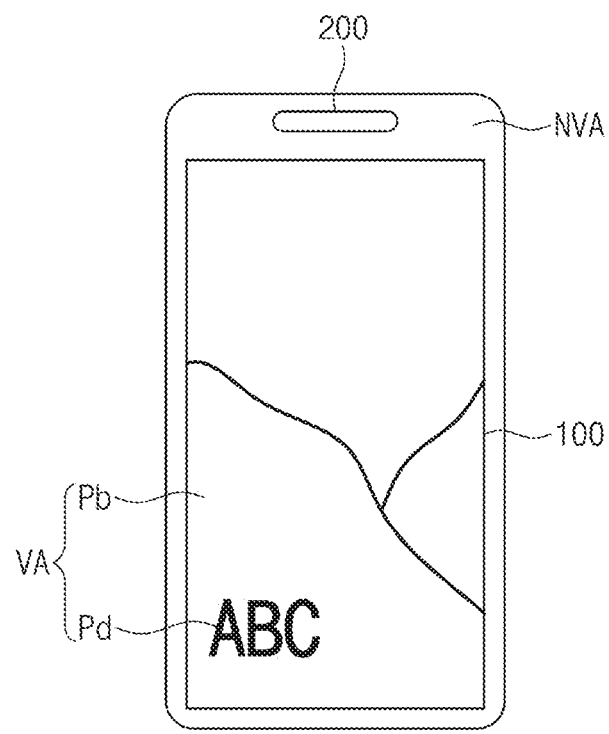
FIG. 12 is a diagram illustrating a transparent display device in which a background image and a display image are displayed on a transparent display panel.

FIG. 12 is a diagram illustrating the transparent display device 1000 in which the background image Pb and the display image Pd are displayed on the transparent display panel 100.

The background image Pb corresponds to an image seen by the user USER through the transparent display panel 100. Therefore, when the image seen through the display area VA changes as a viewpoint of the user USER changes, the background image Pb also changes. The corneal reflection image extractor 200 may detect a change of the viewpoint of the user USER by capturing the image of the eye of the user USER, and may extract the corneal reflection image CRI of the user USER, and thus the background image Pb may be generated without an additional rear camera.

The display image Pd may be an image displayed on the transparent display panel 100 as the timing controller 500 receives the basic image data DATA1 from the external graphic controller (not shown). FIG. 12 illustrates the text "ABC" as an example of the display image Pd displayed on the transparent display panel 100, but an embodiment of the inventive concept is not limited thereto, and thus various information such as time, weather, temperature, or the like may be displayed on the display area VA.

A transparent display device and a method for driving the same according to embodiments of the inventive concept enable acquisition of a background image being seen by a user through a transparent display device without an additional viewpoint detecting sensor.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A method for driving a transparent display device, the method comprising:
   extracting a corneal reflection image comprising a target image projected on a cornea of a user through a display area of a transparent display panel and a display image, wherein the transparent display panel comprises the display area which displays the display image and transmits light reflected from a background, and a non-display area adjacent to the display area;
   generating a flat target image by correcting the corneal reflection image distorted by a curved shape of the cornea;
   generating a background image by removing the display image from the flat target image; and
   displaying the background image on the transparent display panel,
   wherein the transparent display panel comprises gate lines and data lines intersecting with and insulated from each other, and
   wherein the transparent display device further comprises a data driver configured to receive the background image and the display image and output a data voltage to the data lines.

2. The method of claim 1, wherein the generating the flat target image comprises:
   de-warping the corneal reflection image for correcting the corneal reflection image into a flat image; and
   extracting the flat target image from the flat image.

3. The method of claim 2,
   wherein the corneal reflection image further comprises an edge image formed by projecting the non-display area on the cornea,
   wherein the de-warping comprises correcting the edge image into a flat edge image,
   wherein the extracting the flat target image comprises:
   detecting the flat edge image; and
   specifying an image surrounded by the flat edge image as the flat target image.

4. The method of claim 3, wherein the flat target image is formed to have a rectangular shape.

5. The method of claim 3, wherein the detecting the flat edge image comprises extracting feature points of the flat edge image according to passage of time.

6. The method of claim 2,
   wherein the transparent display panel displays a display pattern,
   wherein the extracting the flat target image comprises:
   detecting a display pattern image formed by projecting the display pattern on the cornea; and
   specifying the flat target image by detecting a location of the display area on a basis of the display pattern image.

7. The method of claim 1, wherein the generating the background image comprises:
   generating a transformed image by correcting a resolution and a shape of the flat target image;
   removing the display image from the transformed image; and
   correcting a sharpness of the transformed image.

8. The method of claim 7, wherein the correcting the sharpness comprises dividing the transformed image, from which the display image has been removed, by a transmittance of the transparent display panel.

9. The method of claim 7, wherein the generating the background image comprises correcting a sharpness degraded by a reflectance of the cornea from the transformed image.

10. The method of claim 7, wherein the generating the background image comprises correcting a chroma change according to a light absorption ratio of a pupil of the user by extracting a color of the pupil of the user.

11. The method of claim 1, wherein the extracting the corneal reflection image comprises:
    capturing an image of an eye of the user; and
    generating the corneal reflection image from the captured image of the eye.

12. A transparent display device comprising:
    a transparent display panel comprising a display area which displays a display image and transmits light reflected from a background and a non-display area adjacent to the display area;
    a corneal reflection image extractor configured to extract a corneal reflection image comprising a target image formed by projecting the display area on a cornea of a user and the display image;
    an image detector configured to generate a flat target image by correcting the corneal reflection image distorted by a curved shape of the cornea; and
    a background image generator configured to generate a background image by removing the display image from the flat target image,
    wherein the transparent display panel comprises gate lines and data lines intersecting with and insulated from each other, and
    wherein the transparent display device further comprises a data driver configured to receive the background image and the display image and output a data voltage to the data lines.

13. The transparent display device of claim 12, wherein the image detector comprises:
    a de-warper configured to correct the corneal reflection image into a flat image; and
    a flat target image extractor configured to extract the flat target image from the flat image.

14. The transparent display device of claim 13,
wherein the corneal reflection image further comprises an edge image formed by projecting the non-display area on the cornea,
wherein the de-warper corrects the edge image into a flat edge image,
wherein the flat target image extractor detects the flat edge image from the flat image and specifies an image surrounded by the flat edge image as the flat target image.

15. The transparent display device of claim 14, wherein the flat target image extractor extracts feature points of the flat edge image according to passage of time.

16. The transparent display device of claim 13,
wherein the transparent display panel displays a display pattern,
wherein the flat target image extractor detects a display pattern image formed by projecting the display pattern on the cornea, and specifies the flat target image by detecting a location of the display area on a basis of the display pattern image.

17. The transparent display device of claim 12, wherein the background image generator comprises:
a modulator configured to generate a transformed image by correcting a resolution and a shape of the flat target image; and
a calculator configured to remove the display image from the transformed image and correct a sharpness thereof to generate the background image.

18. The transparent display device of claim 17, wherein the calculator generates the background image by dividing the transformed image, from which the display image has been removed, by a transmittance of the transparent display panel.

19. The transparent display device of claim 12, wherein the corneal reflection image extractor comprises a front camera disposed on the non-display area.

* * * * *